UNITED STATES PATENT OFFICE.

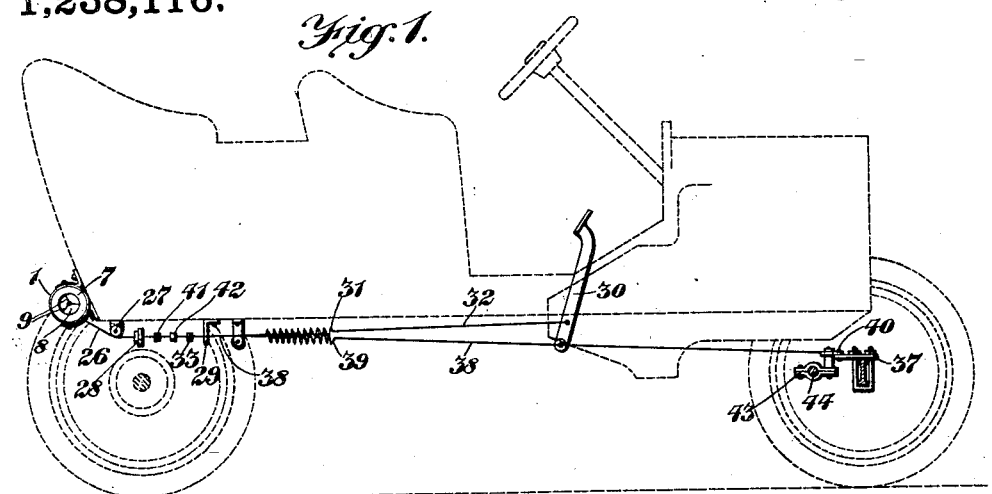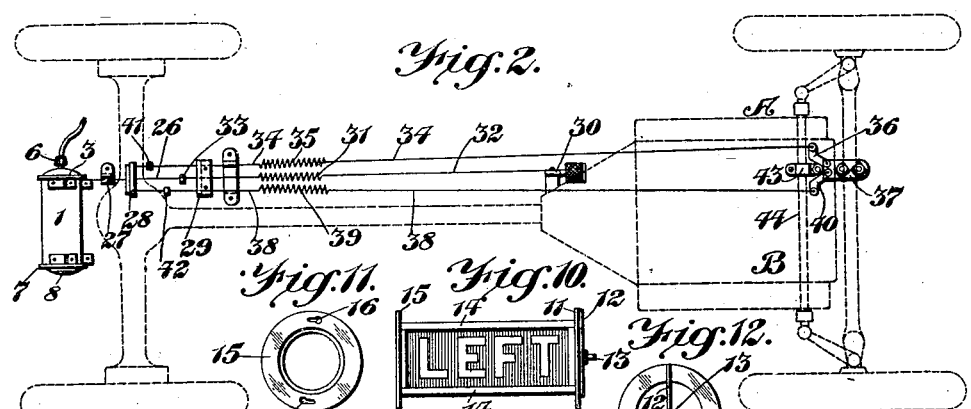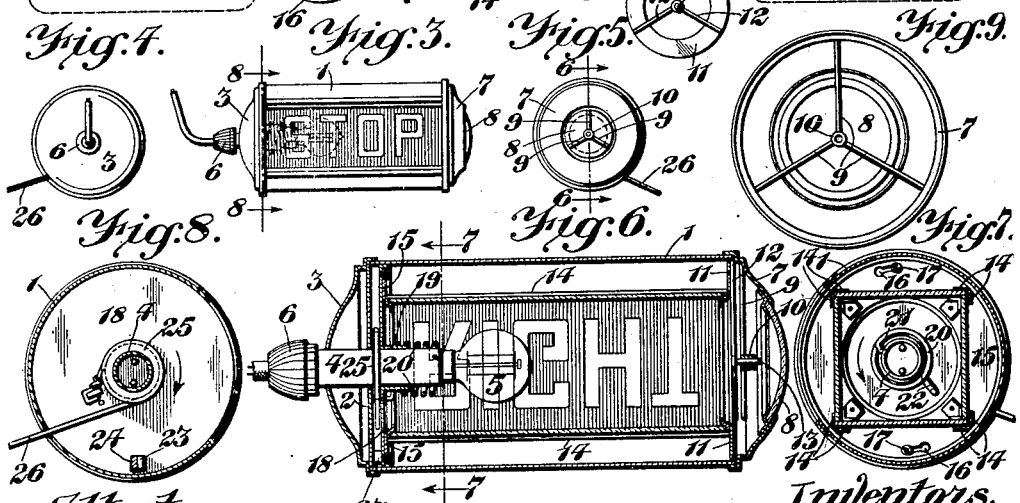

GUILFORD H. DUDLEY AND HENRY A. SIEGRIST, OF ST. LOUIS, MISSOURI.

VEHICLE-SIGNAL.

1,238,116.  Specification of Letters Patent.  Patented Aug. 28, 1917.

Application filed February 28, 1916. Serial No. 80,942.

*To all whom it may concern:*

Be it known that we, GUILFORD H. DUDLEY and HENRY A. SIEGRIST, citizens of the United States, residing at the city of St. Louis and State of Missouri, have invented a new and useful Vehicle-Signal, of which the following is a specification.

This invention relates to vehicle signals.

An object of the invention is to provide a signal device, adapted to be mounted on a vehicle, such as an automobile, including an illuminated signal having distinctive characteristics on different sides thereof, means for supporting the signal upon the automobile for operation to different positions, a connection from the signal to the brake mechanism of the automobile whereby the position of one of the distinctive characteristics on the signal will be moved as an incident to operation of the brake to indicate the condition of the brake mechanism, and connections from the signal actuated by a part of the steering mechanism as an incident to operation of the steering mechanism to turn the vehicle in either direction to indicate the direction in which the vehicle is turning.

Another object of the invention is to coordinate and combine the several operating connections to the signal, whereby the signal will be moved properly to the different positions without interference of the operating connections with each other, or with other parts of the vehicle.

With the foregoing and other objects in view, we have illustrated a preferred embodiment of our invention in the accompanying drawings, in which—

Figure 1 is a view illustrating the invention conventionally applied to an automobile and showing the connections from the signal to a part of the brake mechanism and to the steering mechanism.

Fig. 2 is a plan view of the invention.

Fig. 3 is a view of the signal device in the position by which it is adjusted by operation of the brake mechanism.

Fig. 4 is an end elevation of the signal device showing the electric wiring in connection therewith.

Fig. 5 is an elevation illustrating the opposite end of the signal device which is provided with a glass or transparent closure through which the lamp of the signal may illuminate any other part of the vehicle, such for instance as the license plate.

Fig. 6 is a longitudinal sectional view of the signal on the line 6—6 of Fig. 5, enlarged with respect to the corresponding views.

Fig. 7 is a cross sectional view on the line 7—7 of Fig. 6.

Fig. 8 is a sectional view on the line 8—8 of Fig. 3 looking to the right, as indicated by the arrows.

Fig. 9 is a view of one end of the signal device detached.

Fig. 10 is a side elevation of the movable part of the signal removed from the case in which it is mounted.

Figs. 11 and 12 are views illustrating the ends of the movable part of the signal.

The signal includes a case 1 adapted to be attached in any suitable manner to a selected part of the vehicle. As illustrated the case 1 is composed of sheet metal open at one side and closed at one end as indicated at 2 and provided on the same end with an additional ornamental cap 3. A tubular part 4 is supported by the end 2 and the cap 3 and is provided on its inner end with a socket for an electric lamp 5, and in its outer end receives the connection 6 for the circuit wires which illuminate the lamp. The opposite end of the case comprises an ornamental annular member 7 constituting a frame and support for the glass 8 through which the lamp may illuminate an adjacent portion of the vehicle, such for instance as the license plate. The member 7 also supports a number of radial arms 9 which converge at and carry a hub bearing 10 in axial alinement with the tubular part 4.

A movable frame is mounted within the case 1 and includes an annular end member 11 (Fig. 12) having radial arms 12 converging and supporting an axis member 13 which is journaled in the hub bearing 10. The corner members 14 of the frame are connected with the annular part 11 and with another annular end part 15 (Figs. 10 and 11.) The part 15 has slots 16 (Figs. 7 and 11) which receive screws 17 supported by a plate 18. The plate 18 is formed with a hub 19 (Fig. 6) through which the tube 4 extends, and said plate is revoluble on said tube. A coil spring 20 encircles the tube 4 and has one end attached thereto, as shown at 21 in Fig. 7, and the opposite end attached to the revoluble plate 18, as shown at 22 in Fig. 7.

The spring 20 holds the movable frame in its normal position and restores it to such position after each operation, the normal position being that in which a lug 23 on the plate 18 engages a lug 24 on the end plate 2.

In the form illustrated the movable frame is provided with four glass sides, one of which is blank or plain, the other three sides of which have distinctive characteristics. As shown, one of the sides is provided with the word "Stop," another is provided with the word "Left" and the other side is provided with the word "Right." When the vehicle is traveling in a straight line and the brake mechanism is not in use, the signal is held in its normal position by the spring 20, so that the blank or plain glass side of the movable frame is presented at the open side of case 1; when the brake mechanism is operated the movable frame is moved to position the word "Stop" at the open side of the case, thus indicating the condition of the brake mechanism; when the steering mechanism is operated to turn the vehicle to the right the signal frame is moved to position the word "Right" at the open side of the case, thus indicating the condition of the steering mechanism at that time; and when the steering mechanism is operated to turn the vehicle to the left the movable frame of the signal is operated to position the word "Left" at the open side of the case 1, thus indicating the condition of the steering mechanism at that time.

Referring now to the devices for effecting the operations mentioned, a sheave 25 is attached to the plate 18 between said plate and the end plate 2 of the case. A cable 26 engages within a peripheral groove in said sheave and has one end attached to the plate 18, and the opposite end passing through an opening in the case 1, so that by actuating the cable 26 predetermined distances the movable frame of the signal, which carries the several distinctive characteristics on the different sides thereof, will be positioned in one or another of the positions mentioned to indicate the condition of the brake mechanism, or the condition of the steering mechanism, automatically and as an incident to the operation of either of said mechanisms. As shown, the cable 26 operates against a pulley 27 under the body of the vehicle and has attached thereto a connecting member 28. The cable 26 also extends through a hole in an abutment member 29 attached to some stationary part of the vehicle and is then connected to a part 30 of the brake mechanism by a spring 31 of the retractile type and an additional cable portion 32. Thus, when the brake mechanism is operated and put in use, the revoluble frame of the signal will be turned until the word "Stop" is adjacent to the open side of the case. Movement of the signal device will be stopped in the position mentioned by a stop member 33 attached to the cable 26 and engaging the abutment 29 and any additional or further movement required of the part 30 of the brake mechanism will be permitted by expansion of the spring 31 without corresponding movement of the cable 26, or of the signal device. When the brake mechanism is released, the spring 20 restores the movable frame of the signal to its normal position in which the blank or plain side thereof is adjacent to the opening in the case.

Two sections 34 of cable, united by a retractile spring 35, connect the member 28 with a lever 36 which is pivoted upon a bracket 37 attached in this instance to the front axle of the vehicle. Another connection comprising sections 38 of cable connected by a retractile spring 39 connect the member 28 with another lever 40 pivoted upon the bracket 37 adjacent to the lever 36. The two levers 36 and 40 are of duplicate construction, each being angular or arcuate and diverging outwardly and rearwardly from their pivots.

A stop member 41, on the section 34 of the cable connecting the member 28 with the lever 36, is in such position that movement of the cable 34 and the signal actuating cable 26 will be stopped by engagement of the member 41 against the abutment 29, when the signal member is in position with the word "Right" adjacent to the opening in the case. Any additional or further movement of the lever 36 will be permitted without corresponding movement of the signal by the spring 35.

A stop member 42, similar to the stop member 41, is attached to the rear section of the cable 38 so that when the signal member has been moved to position to place the word "Left" adjacent to the opening in the case, the stop member 42 will contact with the abutment 29 and prevent further movement of the signal. Any additional movement on the part of the lever 40 will be permitted without corresponding movement of the signal member by the spring 39.

The levers 36 and 40 are actuated by devices under control of the steering mechanism so that said levers will be operated automatically and as an incident to operation of the steering mechanism to indicate the condition thereof. In the embodiment illustrated a bracket 43 is attached to the spindle connecting rod 44 included in the steering mechanism and actuated thereby to turn the front wheels of the vehicle. A small roller on the forward end of the bracket 43 operates against the levers 36 and 40 so that, when the steering mechanism is moved to actuate the rod 44 in the direction required to turn the vehicle to the right, the lever 36 will be actuated forwardly moving the cable 34 until the stop 41 engages the abutment 29, at which time the word "Right" on the signal is presented opposite the opening in the case. The signal thereby indicates the condition of the steering mechanism and the fact that the vehicle is turning toward the right, thus enabling those following the vehicle to regulate their course as required by the vehicle carrying the signal. So, also when the steering mechanism is operated to move the connecting rod 44 in the direction of the arrow B to turn the vehicle to the left, the signal will be moved to present the word "Left" opposite the opening in the case. When the steering mechanism is returned to its normal position to steer the vehicle in a straight course the spring 20 automatically returns the signal member in the case to its normal position, in which the plain or blank side thereof is opposite the opening in the case.

It will be observed from the foregoing that our improved signal is automatic in all of its operations and requires no special attention by the chauffeur and that the conditions of the several controlling mechanisms of the vehicle are automatically indicated as an incident to the operation of such mechanisms.

What we claim and desire to secure by Letters Patent of the United States, is:

1. An indicating signal for automobiles, including an illuminated signal having distinctive characteristics on several sides thereof, means for supporting said signal from the automobile for rotary movement, a steering element, a brake element, connections from the signal operated by the steering element and by the brake element independently of each other, whereby the signal will be moved in the same direction by either of said elements to place the distinctive characteristics of the signal in position to indicate the condition of the steering element and of the brake element respectively, means for limiting movement of said connections by the steering element and by the brake element, and means for actuating the signal to its initial position when the steering element is turned to position to direct the automobile in a straight course, and when the brake element is idle.

2. An indicating signal for automobiles, including an illuminated signal having distinctive characteristics on several sides thereof, means for supporting the signal from the automobile for rotary movement, an automobile steering element, a brake element, a device operated by the steering element, a connection from the signal to said device and to said brake element, whereby the signal will be moved in the same direction by either of said elements to place the distinctive characteristics of the signal in positions to indicate the condition of the steering element and of the brake element, and means for limiting movement of said device by the steering element and by the brake element.

3. An indicating signal for automobiles, including an illuminated signal having a distinctive characteristic on each of several sides thereof, means for supporting said signal from the automobile for rotary movement, automobile brake mechanism, a connection from the signal to the brake mechanism, whereby the brake mechanism will mechanically operate the signal to place one of the distinctive characteristics of the signal in position to indicate the condition of the brake mechanism, a device for restoring the signal to its normal position after operation of the brake mechanism, an automobile steering element, devices actuated by the steering element as an incident to operation of the steering element to turn the automobile in either direction, and connections from the signal to said devices for operating the signal in the same direction when the steering element is operated in either direction to place different characteristics thereof in position to indicate the different conditions of the steering element.

4. An indicating signal for automobiles, including an illuminated signal having distinctive characteristics on several sides thereof; means for supporting said signal from the automobile for rotary movement; a steering element; an actuator for rotating the signal; a connection from said actuator operated by the steering element moving in one direction, and an additional connection from said actuator operated to move the actuator in the same direction by movement of the steering element in the opposite direction, whereby the distinctive characteristics of the signal will automatically indicate the condition of the steering mechanism as an incident to the operation of the steering mechansm from its normal position; and means for limiting extent of movement of said actuator by said connections, for the purpose described.

In witness whereof, we have signed this specification in the presence of two subscribing witnesses.

GUILFORD H. DUDLEY.
HENRY A. SIEGRIST.

Witnesses:
N. G. BUTLER,
JOHN D. RIPPEY.